(12) United States Patent
Edwards et al.

(10) Patent No.: US 6,362,811 B1
(45) Date of Patent: Mar. 26, 2002

(54) ERGONOMIC COMPUTER MOUSE

(76) Inventors: George Neil Edwards, 1163 Bretmoor Way, San Jose, CA (US) 95129; Stephen Lee Lippert, 985 Summerfield Dr., San Jose, CA (US) 95125

(*) Notice: Subject to any disclaimer, the term of this patent is extended or adjusted under 35 U.S.C. 154(b) by 0 days.

(21) Appl. No.: 08/689,385

(22) Filed: Aug. 7, 1996

Related U.S. Application Data

(60) Provisional application No. 60/011,909, filed on Feb. 20, 1996.

(51) Int. Cl.[7] ................................................. G09G 5/08
(52) U.S. Cl. ..................... 345/163; 248/118.1; D14/114
(58) Field of Search ................................. 345/161, 163, 345/164, 167, 156; 248/118.1, 118.3; D14/114

(56) References Cited

U.S. PATENT DOCUMENTS

| | | | | |
|---|---|---|---|---|
| 4,754,268 A | * | 6/1988 | Mori ........................... | 345/163 |
| 4,862,165 A | | 8/1989 | Gart ............................ | 345/163 |
| 4,913,573 A | * | 4/1990 | Retter ......................... | 345/163 |
| 4,924,216 A | * | 5/1990 | Leung ......................... | 345/161 |
| 5,260,696 A | * | 11/1993 | Maynard, Jr. ............... | 345/163 |
| D347,833 S | | 6/1994 | Bisenius .................... | D14/114 |
| 5,340,067 A | | 8/1994 | Martin ...................... | 248/118.5 |
| 5,355,147 A | | 10/1994 | Lear ........................... | 345/163 |
| D355,900 S | | 2/1995 | Hilbrink .................... | D14/114 |
| D360,630 S | * | 7/1995 | Franz ......................... | D14/114 |
| 5,464,292 A | * | 11/1995 | Grant ......................... | 248/118.1 |
| 5,490,647 A | * | 2/1996 | Rice ........................... | 248/118.1 |
| 5,538,431 A | * | 7/1996 | Dempster ................... | 434/227 |
| D372,906 S | * | 8/1996 | Kawauchi et al. .......... | D14/114 |
| D374,867 S | * | 10/1996 | Canavan .................... | D14/114 |
| 5,562,270 A | * | 10/1996 | Montague ................. | 248/118.1 |
| 5,576,733 A | * | 11/1996 | Lo .............................. | 345/163 |
| 5,581,277 A | * | 12/1996 | Tajiri .......................... | 345/163 |
| 5,678,800 A | * | 10/1997 | Markussen ................. | 248/118 |
| 5,788,195 A | * | 8/1998 | Rice ........................... | 248/118.5 |
| 5,826,842 A | * | 10/1998 | Paulse et al. .............. | 248/118.1 |
| 5,845,884 A | * | 12/1998 | Terbrack ..................... | 248/118 |

* cited by examiner

*Primary Examiner*—Amare Mengistu
(74) *Attorney, Agent, or Firm*—Carol D. Titus; James J. Leary

(57) ABSTRACT

This invention relates to an improved form of computer mouse. In particular, the physical form of this mouse is designed such that the hand position required to manipulate the mouse is a natural "resting" or neutral position. This position will allow the mouse to be used for long periods of time while minimizing pain and disability in the hand and wrist. The hand is inclined to the horizontal plane typically at an angle of at least 50 degrees. The fingers are flexed, the thumb and index finger are opposed and in close proximity. The wrist is not pulled backwards nor drooped, nor is it angled to one side or the other. There is no deviated wrist movement. Wrist movement is in the natural plane of the wrist.

23 Claims, 8 Drawing Sheets

ERGONOMIC COMPUTER MOUSE

RELATIONSHIP TO OTHER APPLICATIONS

This application claims the benefit of U.S. Provisional Application No. 60/011,909, filed Feb. 20, 1996, which is hereby incorporated by reference in its entirety.

FIELD OF THE INVENTION

This invention relates to an improved form of computer mouse, designed such that the hand position required to manipulate the mouse is a natural "resting" position, thus minimizing pain and disability in the hand and wrist.

BACKGROUND OF THE INVENTION

The hand, when placed on a horizontal surface in front of the body naturally assumes the position wherein the palm is inclined to the horizontal plane typically at an angle from around 50 to 70 degrees. (See FIG. 3) The angle of the hand is measured from the horizontal plane to a line joining the extreme edges of the palm measured from the base of the little finger to the base of the index finger. In this position the fingers are flexed, the thumb (curled) and index finger are opposed and in close proximity (See FIG. 3). The wrist is not pulled backwards (dorsiflexed, see FIG. 1) nor drooped (flexed), nor is it angled to one side or the other (radial/ulnar deviation, see FIG. 2). This position is recognized as a neutral, or natural resting position of the hand by the medical profession. While in this position on a horizontal surface, the hand and forearm can be maintained for long periods without discomfort. It is found that use of the hand which requires prolonged repetitive motion that takes the hand out of this neutral position can cause discomfort and damage. The most widely-known problem of this nature is carpal-tunnel syndrome. Here the bones of the wrist (carpals) form a concavity which is enclosed on the palm side by a ligament (transverse carpal) producing a tunnel through which pass the tendons controlling the fingers and thumb, and the median nerve. It is pressure on the median nerve by thickening of the tendon sheaths, the carpal ligament, or deformation of the bones which causes carpal-tunnel syndrome. Additionally, the muscle which is used to turn the wrist (pronator teres) can also cause compression of the median nerve, simulating carpal-tunnel syndrome.

In particular there are four motions relating to the use of existing mice which contribute strongly to this problem:

Dorsiflexion is where a position is maintained wherein the hand is bent upwards at the wrist, away from the palm (this occurs when the heel of the palm is held on a horizontal surface) which causes severe compression on the median nerve. Typically, the hand has to take on this position in order to manipulate a mouse (See FIG. 1).

Pronation in which the wrist is rotated from the neutral position towards a horizontal position where the palm is approximately parallel to the work surface. Because almost all mouse buttons are relatively flat to the desktop, mouse users must rotate the wrist in order to push a button.

Radial or Ulnar Deviation in which the hand is bent sideways from the wrist either towards the thumb side (radial deviation) or away from the thumb (ulnar deviation). This occurs constantly in mouse manipulation when making fine adjustments to the mouse position (See FIG. 2a–c).

Finger Flexion: the process by which a finger presses down. This causes compression of the median nerve in the wrist. This is the typical action when pressing typical mouse buttons.

In order to fully manipulate the mouse without undue strain, a hierarchy of movement should be possible which allows the whole arm down to the level of the fingertips to be utilized. In order to promote this hierarchy of movement, it should be possible to activate the mouse buttons without having to adjust the position of the hand or fingers, nor to have to hold those parts in a permanently flexed or deviated position. An optimum design for a mouse will therefore support the hand and fingers as they finely control the mouse position while allowing the minimal amount of effort to activate the mouse buttons.

DESCRIPTION OF THE PRIOR ART

Typical existing mouse designs require the hand to be held with the palm in a horizontal or near horizontal position, which causes the wrist to be twisted (pronation) out of its naturally relaxed position. At the same time the wrist is required to be maintained in a position wherein it is bent backwards (dorsiflexion) to accommodate the volume of the mouse in the hand. Additionally, the typical action of pressing a mouse button requires vertical pressure downwards by the finger which requires leverage of the muscles and tendons of the finger against the wrist. The constant pressing by a fingertip on a mouse button thus puts stress on the entire length of the hand from the fingertip to the wrist.

At the same time, it is observed that in order to precisely manipulate the mouse, the heel of the palm and the articulating part of the wrist is rested on the horizontal support surface. This causes direct compression of the carpal ligament. It also forces lateral movement of the hand (radial or ulnar deviation) to allow fine fingertip control. This lateral movement contributes greatly towards pain and damage to the wrist and hand. Over long periods these required hand motions either singly or in combination can lead to pain and permanent disability. Some mouse designs have attempted to remedy these problems in their design. To correct the problem of pronation, U.S. Pat. No. 5,355,147 by Lear utilizes a ring-shaped device which is gripped vertically in the fist. This has several important faults i.e. that it will not allow the finger-and-thumb manipulation necessary for fine control. It also requires the hand to move out of the neutral position into a vertical position. U.S. Pat. No. 4,862,165 by Gart has curvilinear palmar and thenar support surfaces arranged so that thumb and forefinger are brought close together, but has a mouse button located so that the hand has to be held horizontally requiring dorsiflexion, pronation and lateral wrist movement with all the deleterious results as discussed above. Other variations show some tilting of the hand up to 15 degrees to the horizontal which is insufficient to bring the hand into a neutral position.

Nature did not design Homo Sapiens to be a habitual button pusher. The muscles and tendons of the fingers, hand and wrist can take only so much repetitive stress. Nature did, however, design the hand for squeezing, especially between the thumb and index finger. The muscles and tendons of the thumb have been have been enlarged by nature to take advantage of this action. A mouse design which takes advantage of the enlarged thumb muscles for squeezing will help to relieve overall stress to the hand. A design that also allows use of the mouse while maintaining the neutral position will be more comfortable, be usable for long periods of time, and cause less stress to the wrist and hand. Thus, the need exists for a more natural way of activating buttons that is more sympathetic to the musculature design of the human hand.

OBJECTS OF THE DESIGN

The present invention is distinguishable from and an improvement over the relevant prior art by providing a mouse which supports the hand in a neutral position and promotes manipulation and operation of the buttons by a squeezing action using the opposition of thumb and finger. Key objects are as follows:

a. the palmar support surface is tilted at a minimum angle of approximately 35 degrees, and a preferable angle range of 50 to 70 degrees, supporting the hand in a neutral position. In this position the hand can rest on the ulnar side of the heel of the palm, and lateral positioning of the mouse can be achieved by flexion of the wrist in its natural plane of motion. This obviates lateral wrist motion (deviation).

b. the mouse buttons are arranged such that the squeezing action is perpendicular to the plane of the palmar support.

c. the surface of the mouse buttons are concave to direct the squeezing action in opposition to the thumb, and support the fingers in the inclined position.

d. the thumb is supported on a ledge to maintain the neutral hand position e. the pressure of the thumb is directed horizontally against a gripping surface in opposition to the fingers. This provides a sustainable operation of the buttons and manipulation of the mouse by activating the flexor pollicis brevis and opponens pollicis muscles, causing opposition between thumb and finger (especially the index finger) putting less strain on the tendons in the wrist.

f. a concave surface partially supports the little finger so that slight tilting or movement of the little finger can act to brake or anchor the motion of the hand giving finer control. Thus the mouse can be maneuvered with just the use of thumb and finger.

Figure 1:
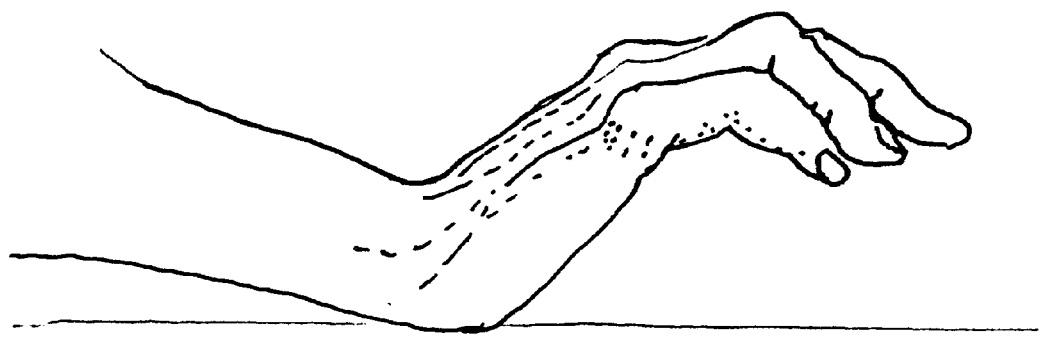
FIG. 1. is a side view of the hand dorsiflexed
Figures 2A, 2B, 2C:
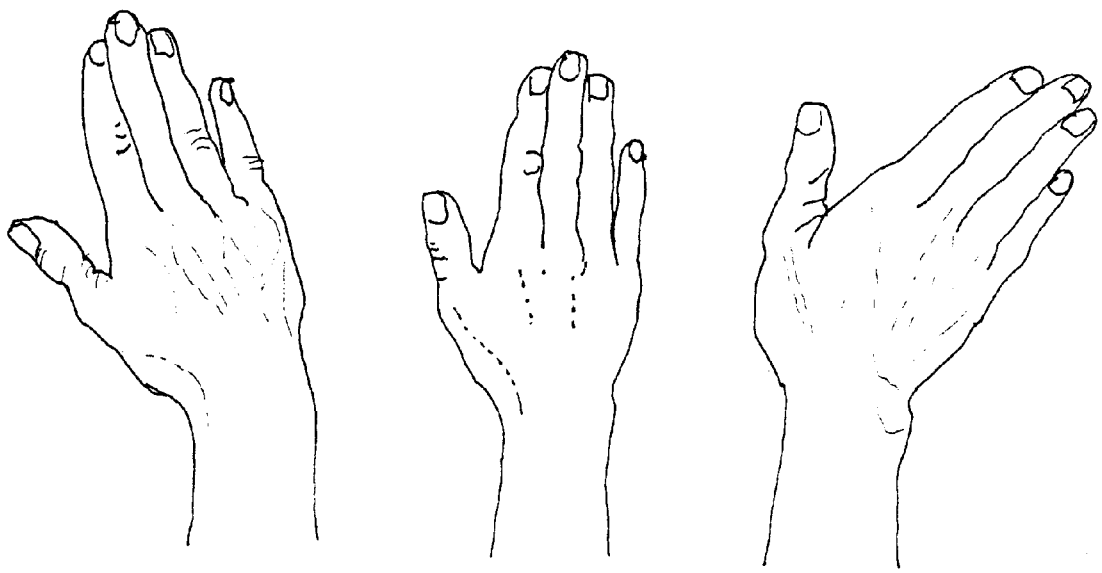
FIG. 2a. shows a hand with radial deviation
FIG. 2b. shows a hand with no deviation
FIG. 2c. shows a hand with ulnar deviation
Figure 3:
FIG. 3. is a perspective view of the hand in the neutral position
Figure 4:
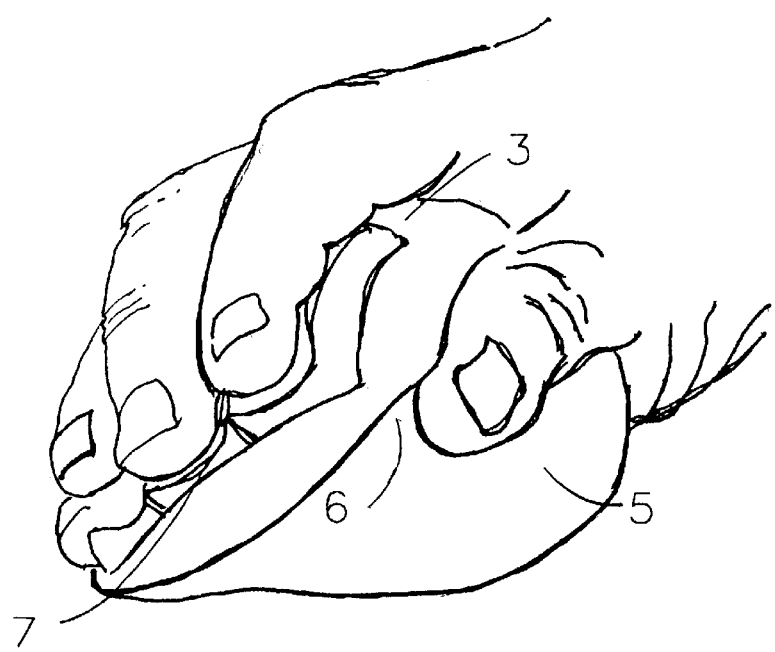
FIG. 4. is a perspective view of the present invention showing hand in position.
Figure 5:
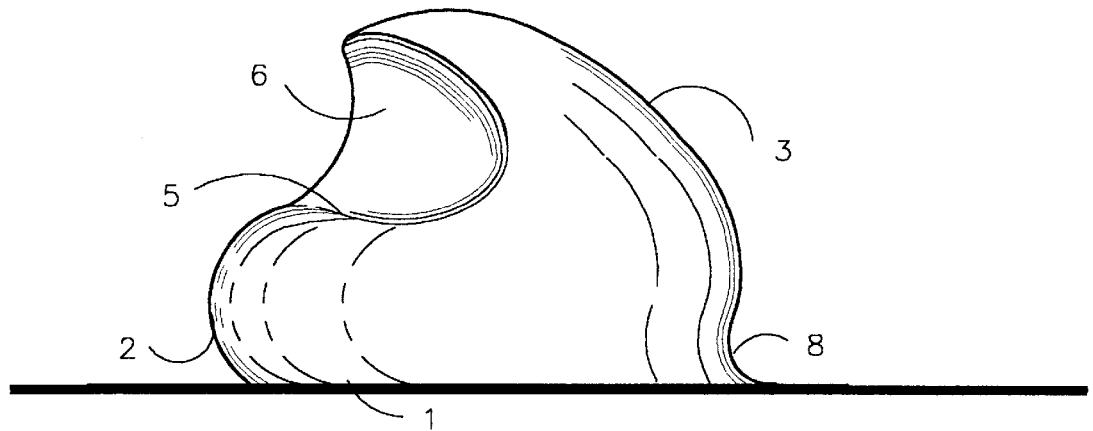
FIG. 5. is a rear elevation view.
Figure 6:
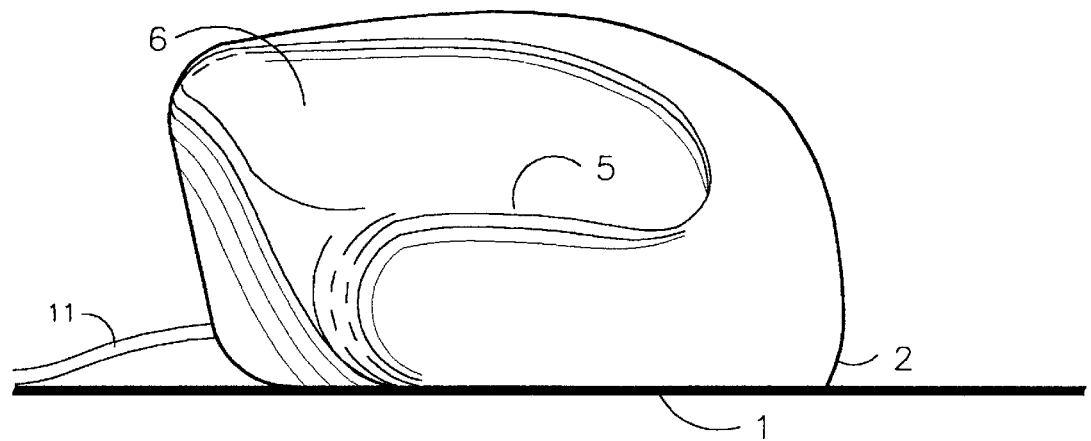
FIG. 6. is a thumb side elevation view.
Figure 7:
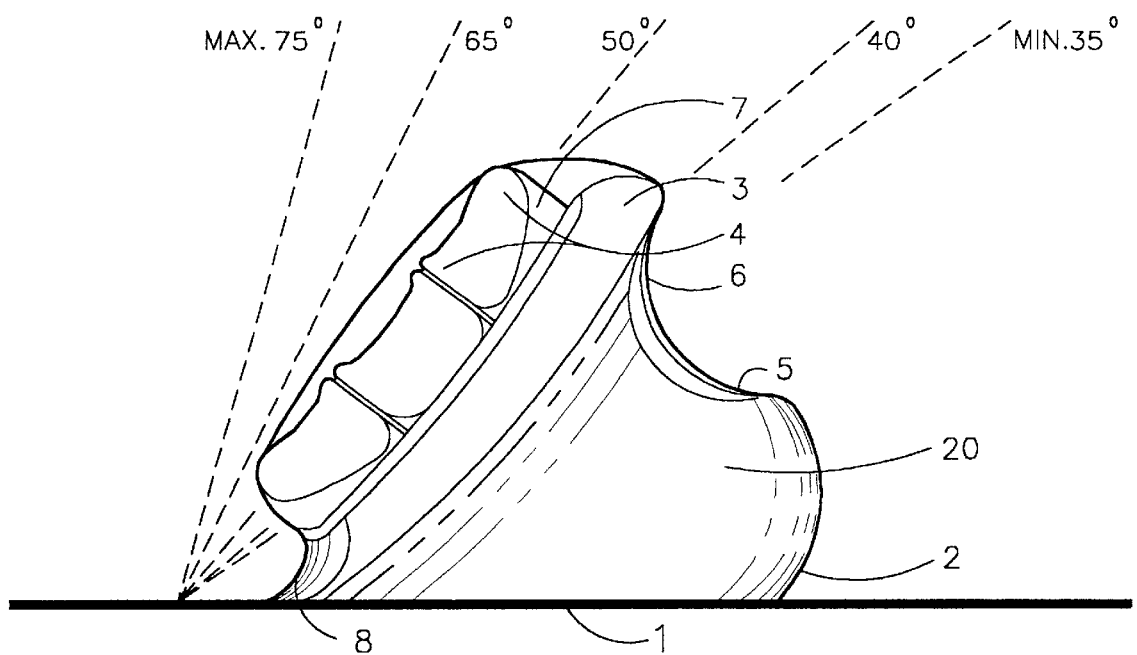
FIG. 7. is a front elevation view.
Figure 8:
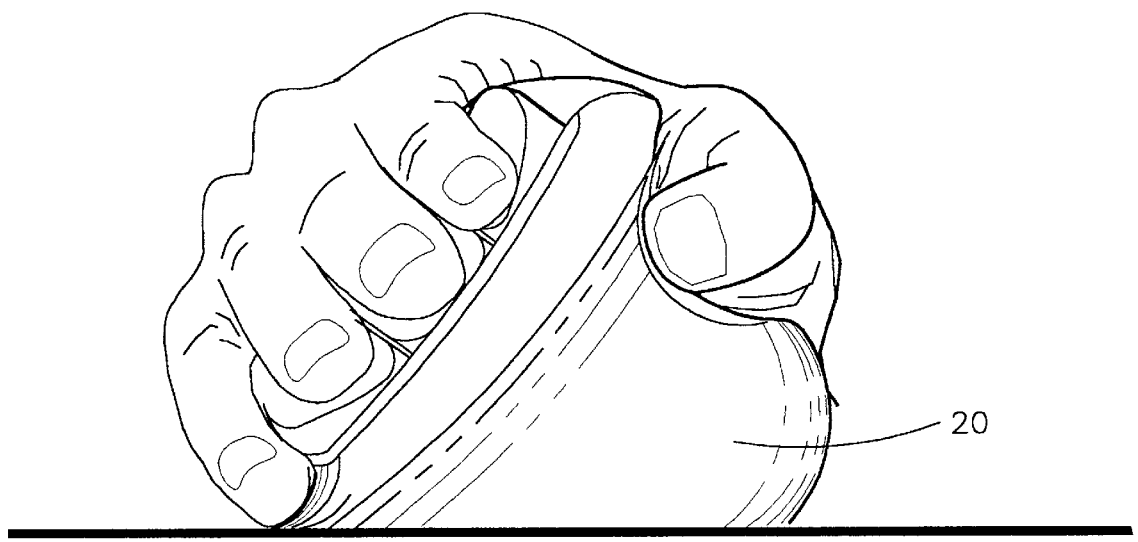
FIG. 8. is a front elevation view showing hand in position
Figure 9:
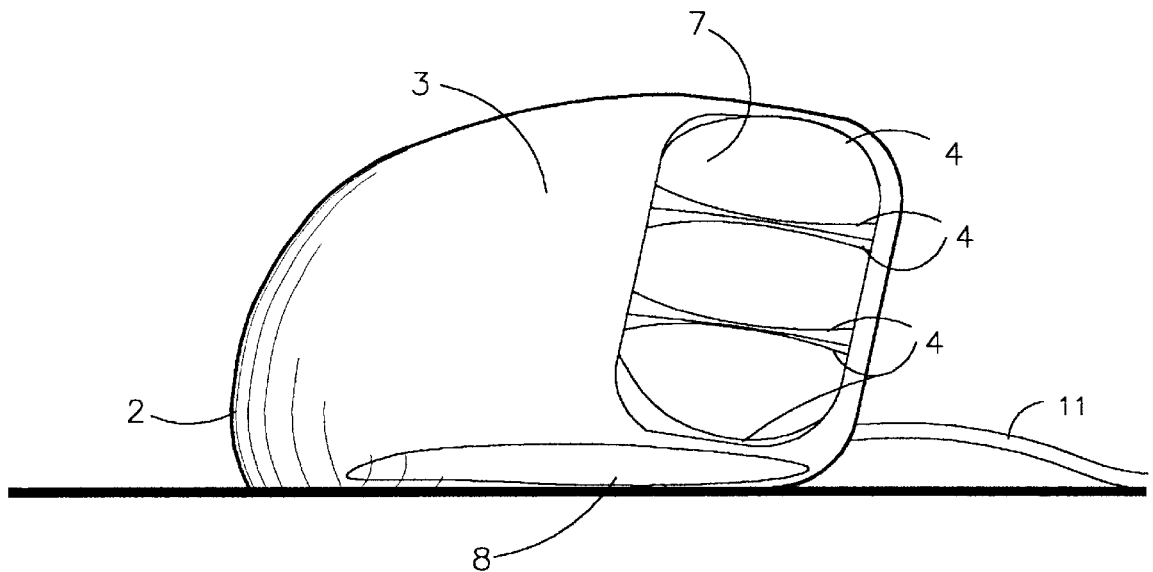
FIG. 9. is a palm side elevation view.
Figure 10:
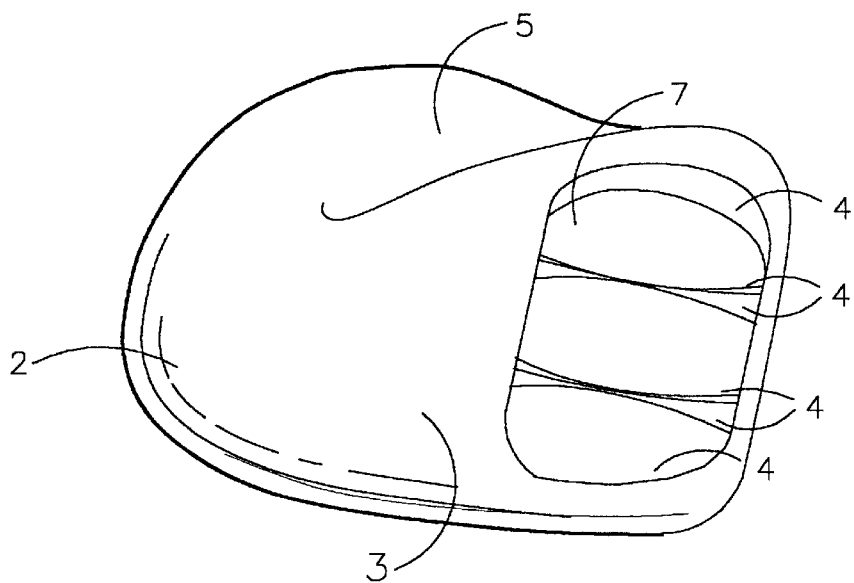
FIG. 10. is a plan view
Figure 11:
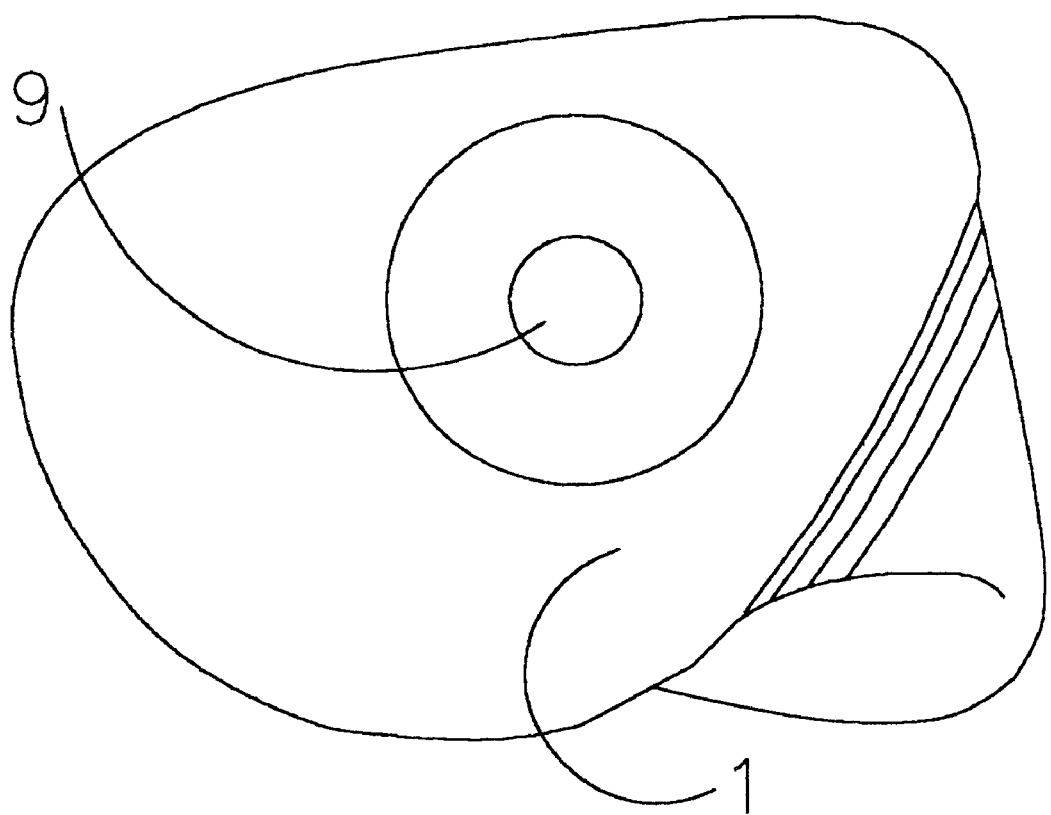
FIG. 11. is a plan view of the underside

1. Planar bottom wall
2. Body housing
3. Palmar-phalangeal support area
4. Raised button edge grip
5. Thenar or thumb support surface
6. Thumb grip
7. Mouse button
8. Little-finger support surface
9. Mouse ball
10. Adjustable palm plate
11. Pivot point
12. Gripping surface
13. Guiding surface
14. Rear palm plate attached to pivot
15. Edge of movable palm plate
16. Mouse cable attached to mouse body
17. Mouse cable attached to palm plate
18. Front palm plate support surface
19. Slidable front palm plate
20. Mouse

DETAILED DESCRIPTION OF THE INVENTION

The mouse 20 is of a size and weight to fit snugly into the hand and be manipulated with no great effort. The mouse body or housing 2 would preferably be made of injected plastic material, but could be cast or other wise formed of any relatively durable material, including materials such as metal, fiberglass, etc. A palm support region or palmar-phalager support 3 is inclined at a minimum angle of approximately 35 degrees to the horizontal, and a preferable angle tilt of between 50 and 70 degrees. An angle tilt of between 70 and 80 is acceptable, but not optimal. At angles steeper 80 degrees, the hand rotates beyond the neutral position. In this position the ulnar side of the hand rests on the working surface. The thumb is supported on a thenar or thumb support 5 of the mouse 20 surface. The thenar or thumb support 5 is formed of a projection which extends form the side of the side of the housing 2, thereby providing a surface on which the thumb may rest. This side of the mouse 20 also curves up around the ball of the thumb and acts as a gripping surface 6 for fine manipulation.

A single or multiple mouse buttons 7 or other signal generating means are located at the anterior or front edge of the palmar-phalageal support 3. Other signal generating means may be heat or motion sensitive or be formed from other actuation means. The surface of the button(s) 7 is concave having edges 4 that project upwards. The edge of the button on the radial side of the wrist form a gripping surface 12, and the edge of the button on the ulnar side of the wrist form a guiding surface 13. The guiding surface 13 allows the user to more easily guide the mouse 20 to a desired location. The gripping surface 12 so that when a button 7 is to be pressed, it is accomplished by pressure of thumb and finger in opposition. This is much easier, and causes less strain than the typical method of direct downward pressure by the digit. Manipulation of the mouse 20 can be made by moving the entire arm, then fine manipulation is made by resting the ulnar edge of the hand on the horizontal surface allowing fingertip control.

As seen best in FIGS. 4 thru 11, this invention comprises a planar bottom wall 1 forming the bottom surface of the housing 2. The area of the housing 2 that spans between the ulnar and radial sides is a palmar-phalangeal or palm support area 3 inclined at and angle of at least 35 degrees, and a preferable angle range of between 50 and 70 degrees, to the horizontal plane. A concave surface terminates the palmar-phalageal support 3 forming a curved shelf to partially support the little finger. This little finger support 8 is for the little finger and allows for the finger to easily slide on and off, so that, when necessary, the little finger can act as a brake or anchor for mouse 20 movement.

At the front edge of palmar-phalageal support 3 and inclined at the same angle are located the mouse button(s) 7 the surface of which is curved to support the first three fingers. The movement of these button(s) 7 is perpendicular to the inclined plane of the palmar-phalageal support 3. On the thumb or side of the mouse body housing 2 there is a thumb support surface 5 which extends towards the front of the mouse 20. This forms a sort of ledge for the thumb to rest on. From the thumb support 5 another surface curves up to provide a thumb grip 6. This, in combination with the button(s) 7 with the gripping edges 4, converts the standard movement of pressing with a single digit to actuate a button 7, to a squeezing motion between the thumb and a finger to actuate the button 7.

Figure 12:
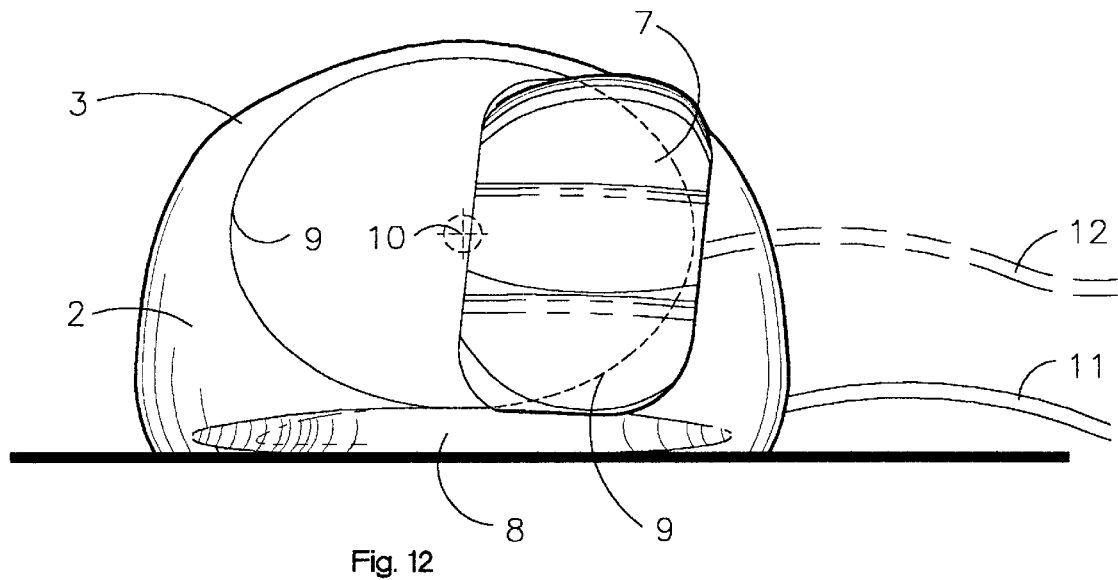
FIG. 12. is an alternate ambidextrous mouse palm elevation with adjustable palm/button plate in right hand position.
Figure 13:
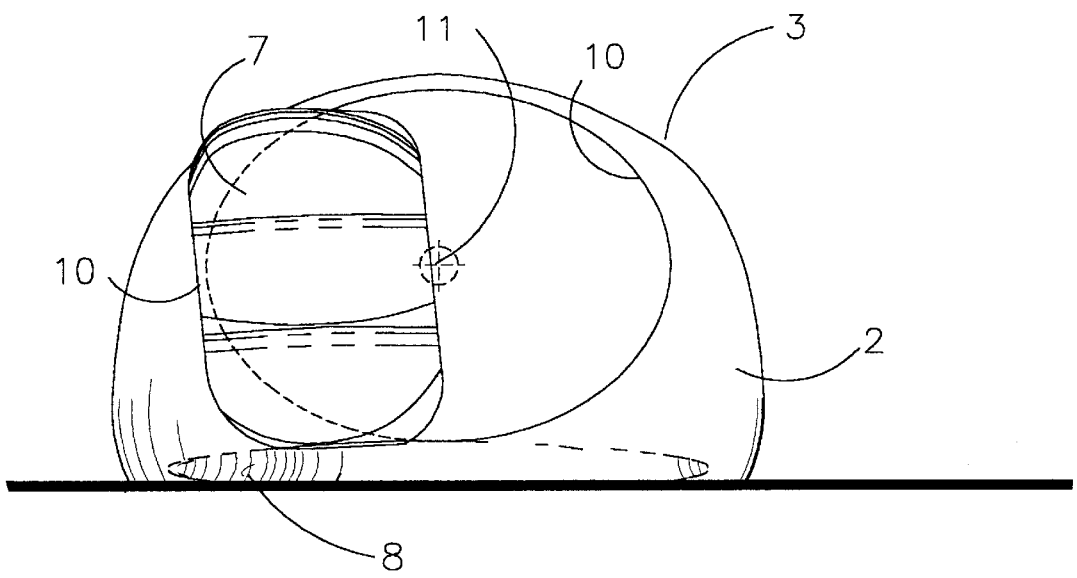
FIG. 13 is an alternate ambidextrous mouse palm elevation with adjustable palm/button plate in left hand position.
Figure 14:
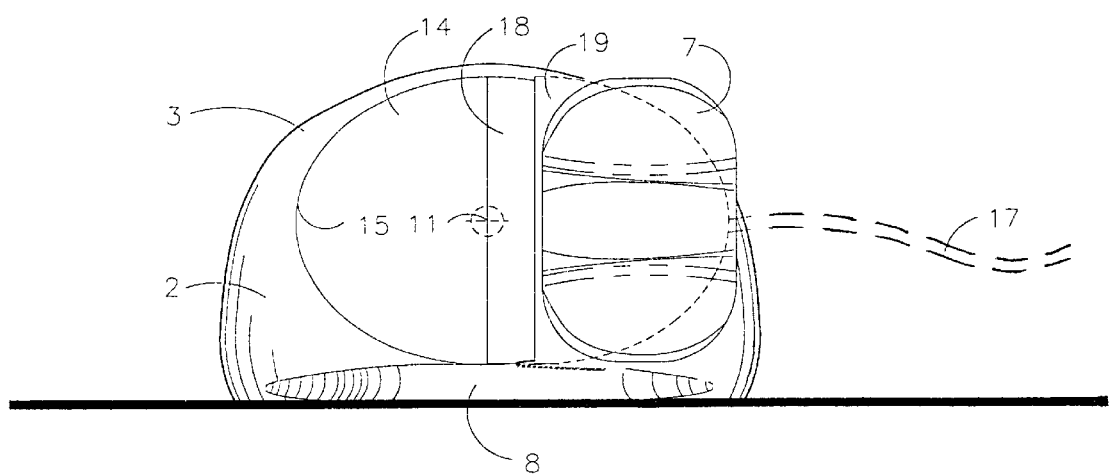
FIG. 14 is an alternate ambidextrous mouse with an expandable adjustable palm/button plate.

FIGS. 12–13 show an adjustable mouse for operation by either a right- or a left-handed user. The adjustable palm/button plate 10 can be removed and placed in a mirrored position so that a left or right handed person may manipulate the mouse. Another option is for the adjustable palm/button plate 10 to be able to rotate around a central point 11 to form right- and left-handed positions. The thumb side of the mouse housing 2 would thus be symmetrical to accommodate either position. The rotation mechanism also allows for fine positioning of the buttons 7 so that they can be slightly askew of normal if the user desires. The plate 10 may be a full palm support region 3 which would adjust between the standard right- and standard left-hand positions. This type of adjustability would also allow the user to choose intermediate positions or rotations if the user preferred the button (s)s 7 in slightly different positions. A second configuration of this embodiment has a small plate 10 which has the mouse button(s) 7. This plate 10 also may be detached and switched to a second configuration or be pivoted around an attached pivot point into both left- and right-handed positions. The adjustable palm/button plate 10 can be divided into a rear section 14 attached to the pivot mechanism, and a front section 19 which houses the button(s), by a sliding joint 18 which allows the front section 19 to be extended forwards.

Discussion

Current mouse art requires horizontal motion of the wrist, which will cause wrist/hand pain when used for extended periods of time. Recent mice have been tilted about 15 degrees. Each degree closer to the neutral position is a degree of extra comfort to the hand. A 35 degree tilt of the mouse would be more comfortable than a 15 degree tilt, because less pronation is required of the wrist. However, a future mouse design slightly tilted from 15 to 35 degrees will still require horizontal wrist motion to operate. A steeper angle is needed to prevent wrist deviation. At a hand tilt of between (+/−) 40 and 50 degrees, the wrist movement gradually transforms from horizontal movement to more natural wrist flexion movement. The most comfortable hand angle for flexure of the wrist on a horizontal surface is around 50–70 degrees.

The mouse as shown allows the hand to manipulate and have fine control while supporting the hand in a neutral strain-free position. The first three fingers are supported by the concave surfaces of the mouse buttons, and the action of squeezing the buttons is transferred into a strong horizontal component, opposed by the pressure of the thumb. The fourth finger is partially supported on a concave support surface allowing it to both grip the mouse, and to anchor the mouse on the surface to allow fingertip control of the mouse. The mouse can be manipulated by moving the entire arm, forearm, wrist and fingers. The ulnar edge of the heel of the palm can be rested on the working surface allowing fine manipulation by slight flexion of the wrist in its natural plane of articulation. Additionally the little finger is held in a partially supported position, just grazing the work surface, and by very subtle motion can brake the motion of the hand and provide a support for very fine manipulation. This finer movement of the mouse can be made just by the manipulation of thumb and first finger.

The alternate ambidextrous mouse can be adjusted in the factory for fixed use or can be continuously ambidextrous for different users at one workstation. The user could remove and relocate the adjustable palm/button plate 10 or twist and rotate the plate. In addition, the ambidextrous mouse could be adjustable for different sized hands. The adjustable palm/button plate 10 could be made of two connected parts that could be lengthened or shortened for different sized hands.

Ramifications and Conclusions

Nature designed the human hand to take advantage of the interaction of the fingers and opposing thumb. The structure of the hand is arranged such that a gripping action of the thumb and fingers, (the index finger in particular) is instinctive, natural, and easily maintainable. Most of human tools have been designed to use our ability to grip or squeeze objects almost effortlessly between thumb and fingers. This invention takes advantage of this natural action to minimize strain in the hand and wrist. As is manifest in the current art, the action of pressing a mouse button requires force to be directed to a finger by stressing muscles and tendons all the way to the elbow, creating a cantilever from forearm to fingertip.

By contrast, this invention is designed such that the actuation of the mouse button is effected by the muscles of thumb and finger working in opposition, which leaves the wrist and forearm less stressed. This action is only possible if the hand is inclined at a sufficient angle to the horizontal (a minimum of approximately 35 degrees, and preferably 50–70 degrees) which brings the hand into a neutral resting position. By supporting the palm of the hand at this inclination, while also supporting the thumb in its naturally opposed location, this design provides the optimum operating position for the hand and wrist. Additionally, by providing a partial support for the little finger, a critical process is promoted i.e. that of being able to anchor the hand on the surface with the little finger while maneuvering the mouse with thumb and index finger. The resting of the little finger on the surface is complementary to the anchoring of the hand on the ulnar side of the heel of the palm. By means of the above the necessary hierarchy of movement to control the mouse is enhanced, in that: the wrist can flex in its natural plane of articulation; the hand is supported in the neutral position; the heel of the palm and little finger either severally or jointly anchor the hand, allowing the thumb and finger to position the mouse precisely. In this position, the only additional movement required to actuate the mouse button is the gentle squeezing of thumb and index finger.

A truly ergonomic ambidextrous mouse option would provide great flexibility for users, for many office and home terminals may get different handed personnel during the day.

Also, a useful mouse device would include a sensitivity dial, button, or switch mechanism. The user would therefore be able to adjust relative screen cursor movement to mouse motion by manipulation of a dial, button or switch mechanism directly on the mouse. This would help reduce the strain of fine mouse motion.

Although the examples given include many specificities, they are intended as illustrative of only one possible embodiment of the invention. Other embodiments and modifications will, no doubt, occur to those skilled in the art. For example, the mouse may be used with any type of communication medium between the mouse and computer, direct wire link, radio frequency signals, infrared, etc. The configuration of the mouse may also be used for other devices such as pucks or even non computer related hand controls, such as controls for heavy equipment, where the user has his or her hands on the controls and must manipulate the controller. Thus, the examples given should only be interpreted as illustrations of some of the preferred embodiments of the invention, and the full scope of the invention should be determined by the appended claims and their legal equivalents.

We claim:

1. A computer input device, comprising:
   a bottom surface,
   a palm support surface having a first end and a second end,
   and a palm plate having a front edge, at least one button located on said palm plate adjacent said front edge, said palm plate being selectively positionable with respect to said palm support surface in at least a first position and a second position, said first position having said front edge of said palm plate adjacent said first end of said palm support surface, said second position having said front edge of said palm plate adjacent said second end of said palm support surface.

2. The computer input device of claim 1 wherein said palm plate may be rotated from said first position to said second position and from said second position to said first position.

3. The computer input device of claim 2 wherein said palm plate lies generally in a plane and said palm plate is rotated about an axis generally perpendicular to said plane.

4. The computer input device of claim 1 wherein said palm plate may be positioned in a third position, said third position being intermediate said first position and said second position.

5. The computer input device of claim 1 wherein said palm support surface is inclined at an angle to said bottom surface wherein one of said left side and said right side is higher than the other of said left side and said right side.

6. The computer input device of claim 5 wherein said angle is between 40 and 90 degrees.

7. The computer input device of claim 1 further comprising a thumb support, said thumb support extending from said palm support.

8. The computer input device of claim 1 further comprising a little-finger support, said little-finger support extending from said palm support.

9. The computer input device of claim 1 further comprising an expansion means for increasing the distance between said at least one button and an end chosen from the group of ends consisting of said first end and said second end.

10. The computer input device of claim 9 wherein said expansion means expands to at least one discrete point.

11. The computer input device of claim 9 wherein said expansion means expands to a plurality of discrete points.

12. The computer input device of claim 9 wherein said expansion means is resisted by a frictional force.

13. The computer input device of claim 1 wherein said palm plate is detachably attached to said housing.

14. A computer input device, comprising:
    a bottom surface,
    a palm support surface having a first end and a second end,
    and a palm plate having a front edge, at least one button adjacent said front edge of said palm plate, said palm plate being selectively positionable with respect to said palm support surface in at least a first position and a second position, said first position having said front edge of said palm plate adjacent said first end of said palm support surface, said second position having said front edge of said palm plate adjacent said second end of said palm support surface,
    wherein said at least one button is located on a palm plate which is detachably attached to said palm support surface.

15. The computer input device of claim 1 wherein said palm support surface is inclined at an angle to said bottom surface wherein one of a left side and a right side is higher than the other of said left side and said right side.

16. The computer input device of claim 14 wherein said palm plate and said at least one button is positionable in a third position, said third position being intermediate said first position and said second position.

17. The computer input device of claim 14 further comprising a thumb support, said thumb support extending from said palm support surface.

18. The computer input device of claim 14 further comprising a little-finger support, said little-finger support extending from said palm support surface.

19. The computer input device of claim 14 further comprising an expansion means for increasing the distance between said at least one button and an end chosen from the group of ends consisting of said first end and said second end.

20. The computer input device of claim 19 wherein said expansion means expands to at least one discrete point.

21. The computer input device of claim 19 wherein said expansion means expands to a plurality of discrete points.

22. The computer input device of claim 19 wherein said expansion means is resisted by a frictional force.

23. The hand-operated device of claim 14 wherein said palm plate lies generally in a plane and said palm plate is rotatable about an axis generally perpendicular to said plane.

* * * * *